United States Patent

Spaulding et al.

[11] Patent Number: 5,949,967
[45] Date of Patent: Sep. 7, 1999

[54] TRANSFORMING INPUT COLOR VALUES TO DEVICE CONTROL SIGNALS

[75] Inventors: Kevin E. Spaulding, Spencerport; Kevin C. Scott, Rochester, both of N.Y.

[73] Assignee: Eastman Kodak Company, Rochester, N.Y.

[21] Appl. No.: 08/989,557

[22] Filed: Dec. 12, 1997

[51] Int. Cl.[6] .................................................. G06F 15/00
[52] U.S. Cl. ........................ 395/109; 382/166; 382/167; 382/162; 395/131; 345/431
[58] Field of Search ................................... 395/109, 131; 382/167, 166, 162; 358/518; 345/431

[56] References Cited

U.S. PATENT DOCUMENTS

| 5,704,026 | 12/1997 | Wan | 395/131 |
| 5,712,925 | 1/1998 | Ohga | 382/167 |
| 5,721,572 | 2/1998 | Wan et al. | 345/431 |
| 5,767,992 | 6/1998 | Tanaka et al. | 382/167 |
| 5,801,854 | 9/1998 | Naylor, Jr. | 382/167 |

*Primary Examiner*—Jose L. Couso
*Assistant Examiner*—Anh Hong Do
*Attorney, Agent, or Firm*—Pamela R. Crocker

[57] ABSTRACT

A method for transforming input color values to device control signals for a color printing device having an output response that is approximately invariant for ranges of the device control signals near the maximum or minimum allowable device control signals, wherein the input color values are transformed into the device control signals that are to be used to reproduce the input color values is disclosed. The method includes determining color reproduction characteristics for the color printing device over an allowable range of input signal values; determining a full color gamut for the color printing device describing a full range of color values that can be produced by the color printing device; creating a reduced color gamut by shrinking the full color gamut; and transforming the input color values to the device control signals using the determined color reproduction characteristics of the color printing device, wherein the input color values that are outside the reduced color gamut are mapped to color values that are on or within the reduced color gamut.

28 Claims, 5 Drawing Sheets

TRANSFORMING INPUT COLOR VALUES TO DEVICE CONTROL SIGNALS

FIELD OF THE INVENTION

This invention relates to the field of digital imaging, and more particularly to the field of transforming input color values to device control signals.

BACKGROUND OF THE INVENTION

There are many different types of color printing devices that can be used to produce digital color images including softcopy displays, and hardcopy devices such as electrophotographic printers, ink-jet printers, thermal dye-transfer printers, and output writers which write onto photographic materials. These devices are generally driven by a set of device control signals which are used to control the amount of colorant produced for each of a series of color channels. The form of the control signal will vary as a function of the type of color printing device. In some cases, the control signal may be a voltage, in other cases it may be a pulse count, etc. Generally, the various control signals can be represented by a set of digital code values, one digital code value for each color channel.

Each type and model of color printing device will typically have its own unique color reproduction and color gamut characteristics. As a result, a given set of device control signals will produce one color on a first device, and will produce a second different color on a second device. Similarly, a color which is within the color gamut of a first device, may be outside the color gamut of a second device, and therefore, will not be reproducible.

The wide variety of color reproduction and color gamut characteristics that exist for various color printing devices has led to a need for developing color management solutions. Color management solutions generally involve characterizing the output response of a color printing device as a function of the device control signals. This characterization of the device output response is sometimes referred to as a device profile. The output response is typically measured in terms of device-independent color spaces that are derivatives of the well-known CIE XYZ tristimulus values. Popular color spaces include CIELAB and CIELUV, but there are numerous other possibilities. Once the output response of the color printing device has been characterized, it is then possible to determine the device control signals that are necessary to produce some desired aim color. Therefore, if color reproduction characteristics of the various input and output devices in a color reproduction system are known, it is possible to determine the device control signals that are required to produce a match between an input and an output color image.

The output response of a digital printing device is typically characterized by printing a set of color patches using known device control signals. The color patches are then measured using an instrument such as a spectrophotometer or a colorimeter to determine the corresponding output response for each color patch. A model of the resulting output response is then determined as a function of the device control signals. Different approaches for determining the output response model include fitting some type of polynomial function to the data, or building an interpolative model to interpolate between the measured patch values. Quite often, the color patches are chosen so that they fall on a lattice of device control signals. FIG. 1 illustrates a lattice 10 of device control signals. In this case, the device control signals correspond to three different color channels: cyan, magenta, and yellow.

Since it is usually important to be able to determine to device control signals necessary to produce a desired output response, it is typically necessary to be able to invert the output response models. As long as the output response of the color printing device is well-behaved, there are many techniques that can be successfully applied to perform this inversion process. However, there are a number of problems that are encountered when the output response has certain characteristics. One particularly difficult type of problem to deal with involves regions of color space where changes in the device control signal do not produce significant changes in the device response. FIG. 2 shows a one-dimensional example of this type of device response. Throughout much of the device control signal range, the device response function 20 is well-behaved. However, in the toe 22 and shoulder 24 portions of the device response function 20, it can be seen that a change in the device control signal results in no changes in the output response. Consequently, there are many different values of the control signal which will produce the same output response. The difficulty comes when it is necessary to invert the output response. If it is desired to produce a particular output response that is at, or near, one of the flat regions in the device response, there are many possible device control signals that can be used to obtain the desired response. The problem is exacerbated by the presence of any noise in the measured output response. In this case, the flat regions of the device response function 20 can have small non-monotonicities which complicate the inversion process further.

The net result of these flat regions in the device response function 20 is that small changes in the desired output response can result in large changes in the device control signal. Or even worse, the relationship between the desired output response and the corresponding device control signal may be non-monotonic. Simplistically, it might be concluded that these phenomena are somewhat irrelevant since all of the device control signals in question map to the same output response anyway. However, this is not always the case. Sometimes, even though the changes in the output response may be small relative to a measuring instrument, the human eye may be able to detect contours in an image where the device control signal makes a large jump. This is particularly true if the device response changes a little between the time that the device response was characterized, and the time when an image is generated. In this case, it is possible that two control signals which may have originally produced an identical output response, may now produce a noticeably different device response.

FIG. 3 shows an example of a device response function 30 for a typical color printing device. In this case, the grid lines correspond to the output response (in the CIELAB color space) for the lattice of device control signals that was shown in FIG. 1. It can be seen that the device response function 30 has the same topology as the cube in FIG. 1, except that it has been distorted to represent the color reproduction characteristics of the color printing device. Labels are shown indicating the directions of increasing cyan (C), magenta (M) and yellow (Y) colorants. For this example, it is assumed that the amount of colorant that is produced for each of the color channels follows a relationship like that shown in FIG. 2. It can be seen for parts of the color space corresponding to device control signals that are not near one extreme or the other 32, that the device response function 30 changes smoothly with changes in the device control signal. However, for parts of the color space where one or more of the device control signals are near one extreme or the other 34, the resulting device response function 30 is approximately invariant. This can be seen from the fact that the grid lines are bunched up close together. In the extreme case, the grid-lines would lie on top of each other, or could even be jumbled due to noise or non-monotonicities in the device response. For example, as the device control signal for one of the channels is increased, the device response may remain approximately constant. It should be noted that the invariance is not limited to changes with respect to a single input channel. In some cases, the device response may remain approximately constant when two or more of the device control signals are simultaneously changed, even if the device response is not invariant when a single device control signal is changed.

Determining an inverse model for a device like that shown in FIG. 3 is problematic as a result of the approximately invariant regions in the device response function 30. For example, some common techniques for creating an inverse model involve inverse tetrahedral interpolation techniques. In this case, each of the lattice cubes in a lattice of device control signals, like that shown in FIG. 1, is divided into a set of tetrahedra. One method for dividing a lattice cube 40 into six tetrahedra 42 is illustrated in FIG. 4. The corresponding device response function shown in FIG. 3 would also be subdivided into corresponding tetrahedra. To perform an inverse interpolation, it is then necessary to identify which of the tetrahedra of the device response function 30 a specific aim color falls within, and the corresponding device control signals are then computed. However, if there are approximately invariant regions in the device response function 30, this process will result in large changes in the device control signals for only small changes in the aim color. An even worse problem can occur when a given aim color may fall within several different tetrahedra due to inconsistencies in the topology of the node positions, and may therefore result in unstable estimates of the corresponding device control signals. Other prior art approaches for building an inverse model will suffer from similar problems. As a result, the inverse models frequently suffer from artifacts such as noise and contouring for colors that fall near or within these approximately invariant regions in the device response function. The artifacts can become particularly pronounced if the device response drifts between the time that the inverse model was determined, and the time when an image is printed. In this case, two device control signals which may have produced an identical output response to begin with may now produce significantly different output responses.

SUMMARY OF THE INVENTION

It is an object of the present invention to provide a method for transforming color values for a device having approximately invariant regions in the device response function that overcomes the limitations of the prior art.

This object is achieved by a method for transforming input color values to device control signals for a color printing device having an output response that is approximately invariant for ranges of the device control signals near the maximum or minimum allowable device control signals, wherein the input color values are transformed into the device control signals that are to be used to reproduce the input color values, comprising the steps of:

a) determining color reproduction characteristics for the color printing device over an allowable range of input signal values;

b) determining a full color gamut for the color printing device describing a full range of color values that can be produced by the color printing device;

c) creating a reduced color gamut by shrinking the full color gamut; and d) transforming the input color values to the device control signals using the determined color reproduction characteristics of the color printing device, wherein the input color values that are outside the reduced color gamut are mapped to color values that are on or within the reduced color gamut.

ADVANTAGES

The present invention has the advantage in that it avoids using device control signals that correspond to portions of color space where the output response is approximately invariant for some range of the device control signals. As a result, it is possible to avoid the situation where small changes in the input color value produce large changes in the device control signals, thereby avoiding the associated contouring and noise artifacts.

The present invention has the additional advantage that the resulting color transform will be less sensitive to variations in the device response over time with respect to susceptibility to contouring and noise artifacts.

DETAILED DESCRIPTION OF THE INVENTION

The present invention represents a method for transforming input color values to device control signals for a color printing device having an output response that is approximately invariant for some range of the device control signals near the maximum or minimum allowable device control signals, which overcomes the problems associated with the prior art techniques. The resulting color transform maps input color values to the device control signals that should be used to reproduce the input color values without introducing objectionable artifacts such as contouring and excessive noise.

Figure 5:
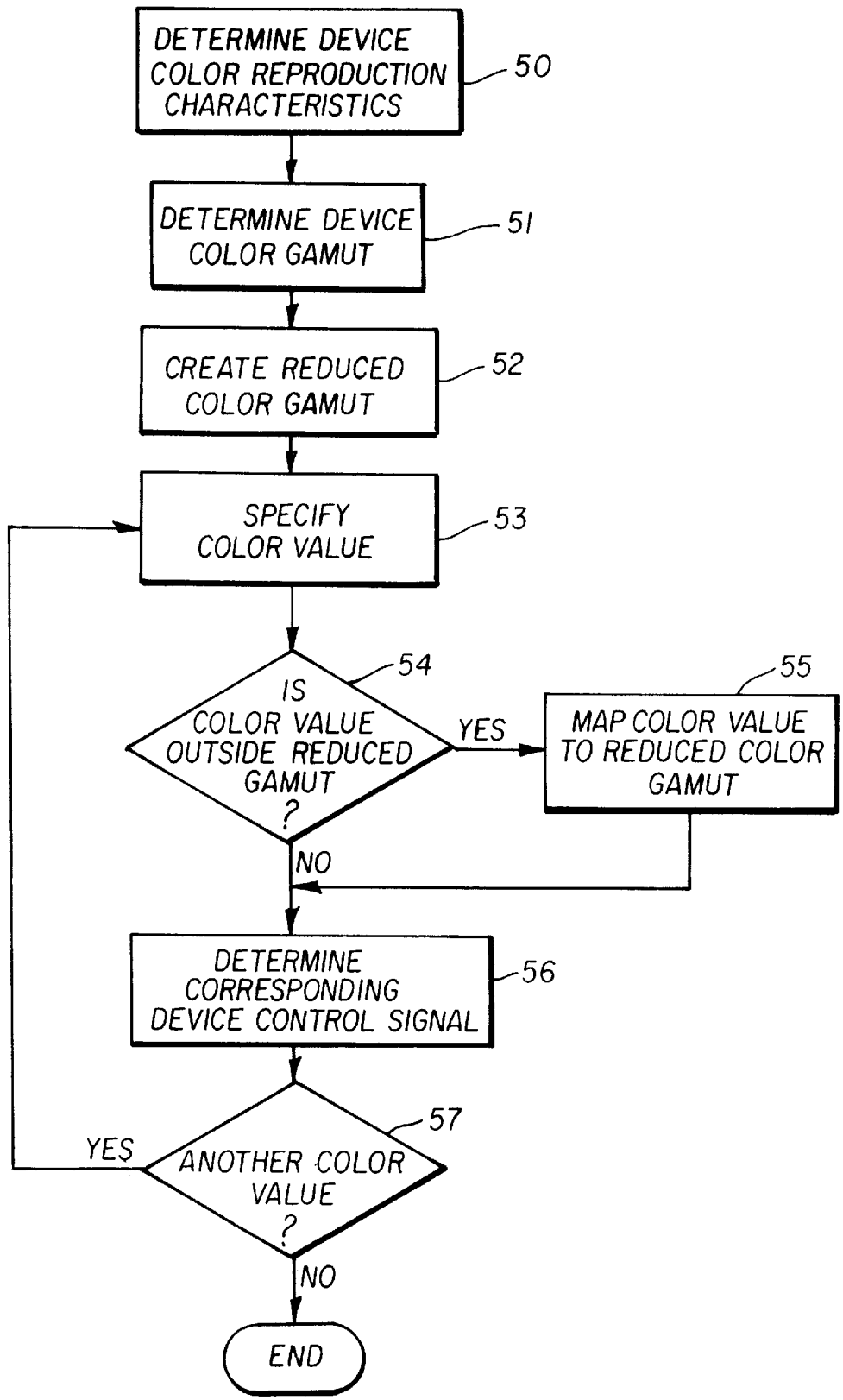
FIG. 5 is a flow diagram showing the method in accordance with the present invention.

A flow diagram illustrating the basic method of the present invention is shown in FIG. 5. In summary, a device color reproduction characteristics determining step 50 is first used to characterize the device response function for a color printing device. Next, a device color gamut determining step 51 is used to characterize the full color gamut of the color printing device. A reduced color gamut creation step 52 is then used to shrink the size of the full color gamut to form a reduced color gamut. Next, an input color value of interest is specified using a color value specification step 53. A color value gamut check step 54 is used to identify whether the input color value is outside the reduced color gamut. For input color values that are outside the reduced color gamut, a gamut mapping step 55 is used to map the input color value to a new input color value that is within or on the surface of the reduced color gamut. Finally, a corresponding device control signal determining step 56 is used to determine the device control signals that are necessary to produce the new input color value. This process is repeated for each of the input color values that need to be processed. If there are no further input color values to be processed, an end of process test 57 is used to terminate the loop.

We will now consider each of these steps in more detail. There are many ways that the device color reproduction characteristics determining step 50 can be accomplished to characterize the device response function for a color printing device. Generally this step involves computing a model of the color printing device. Commonly, this is accomplished by printing a set of color patches with known device control signals. The printed test patches are then measured using a device such as a densitometer, or, preferably, a calorimeter or spectrophotometer. These devices characterize the color values of the printed patches using some type of color space. Preferably the color values are measured using a device-independent CIE-based color space which can be related to the color vision of a normal human observer. In a preferred embodiment of this invention, a visually uniform color space, such as the well-known CIELAB or CIELUV color spaces, is used. However, it is also possible to use other types of color spaces, such as conventional Status-A optical density values.

Figure 1:
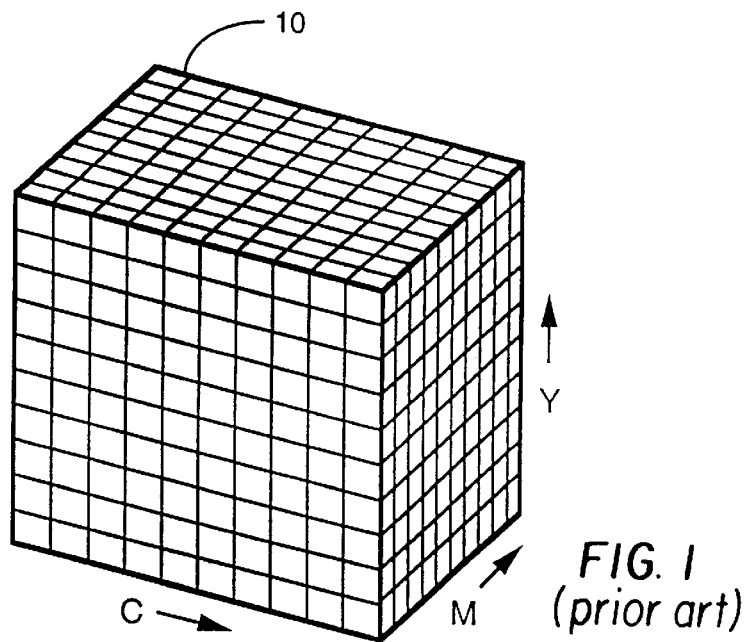
FIG. 1 is a diagram showing a lattice of device control signals.
Figure 2:
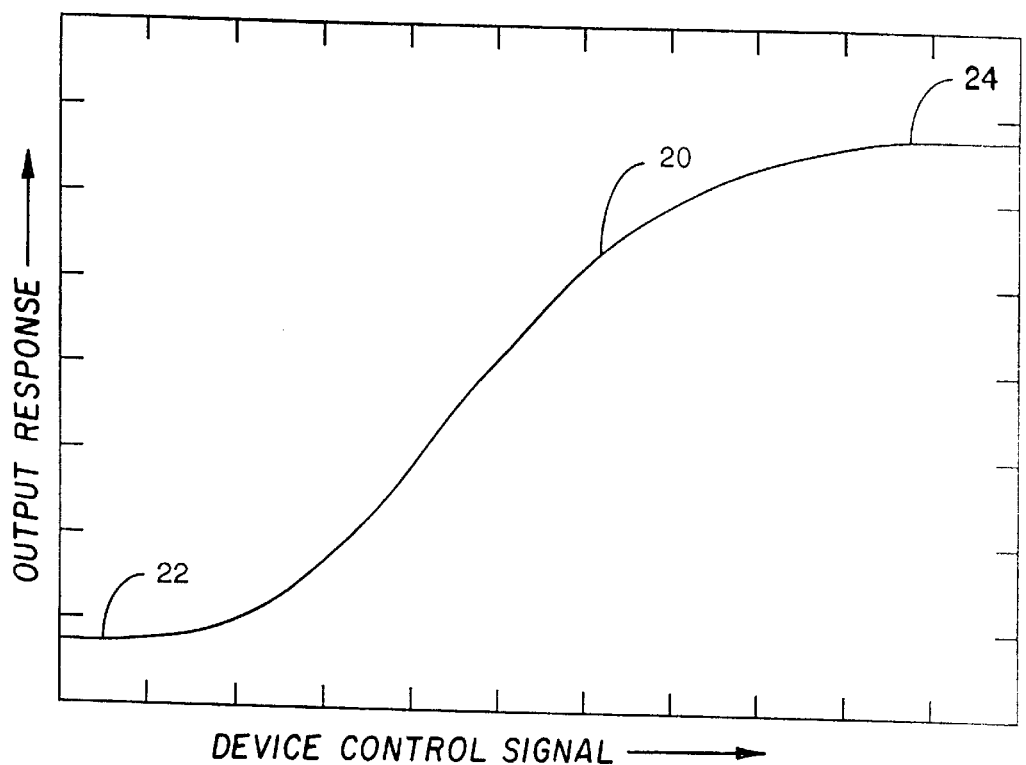
FIG. 2 is a graph of a typical device response function plotting output device versus device control signal.

The device control signals used to generate the set of color patches may be different for different applications. In many cases, it is convenient to use a lattice of device control signals that span the full range of possible device control signals. An example of this type of lattice was shown in FIG. 1. Depending on the application, it may be desirable to use other patches in addition to the lattice of device control signals, or to use a different series of device control signals altogether.

Once the set of color patches have been printed and measured, this data is typically used to create a model of the output response for the color imaging device. There are many different techniques that can be used to create this model. For example, a polynomial function can be fit to the measured device response data, or an interpolation approach can be used to estimate the device response at color values that are intermediate to the measured patch values. Sometimes it is possible to create a model of the device response without printing test patches if an accurate enough understanding of the physics of the color printing device is known. No matter what approach is used, the result will generally be a model which relates the device control signals to the corresponding output response, as represented in a color space such as CIELAB.

Figure 3:
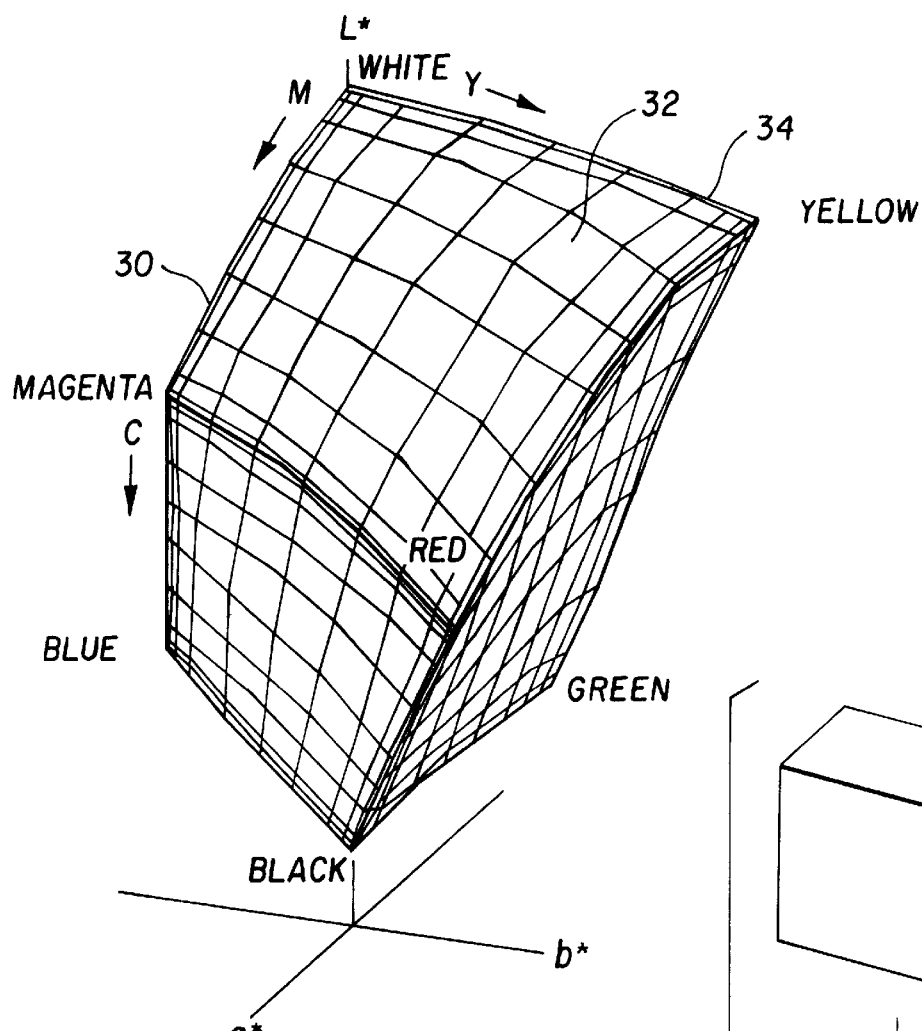
FIG. 3 is a diagram showing the device response corresponding to a lattice of device control signals.
Figure 4:
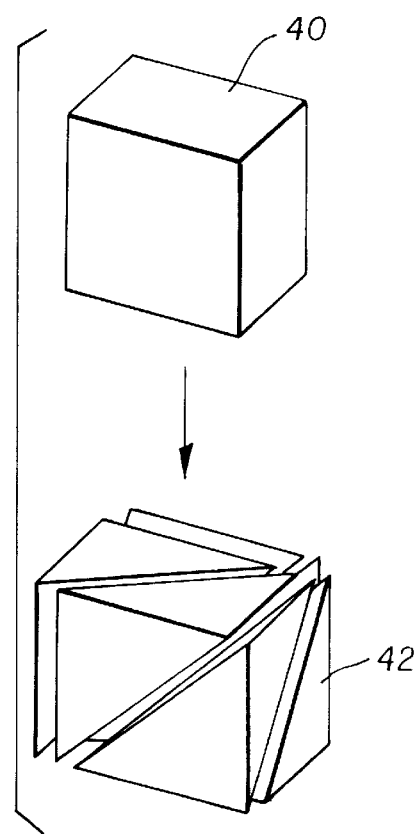
FIG. 4 is a diagram showing how a lattice cube can be subdivided into a set of tetrahedra.

The next step is the color gamut determining step 51, which is used to characterize the full color gamut of the color printing device. The color gamut is defined to be the set of color values that can be produced by a specific color printing device. A color that can be produced by the color printing device is said to be "in-gamut." A color that is outside the set of color values that cam be produced by the color printing device is said to be "out-of-gamut." Considering FIG. 3, which shows an example of a device response function for a typical color printing device, the color gamut is represented by the surface of the device response function.

There are a number of different methods that could be used to define the full color gamut of the color printing device. For example, the convex hull of all possible output response values can be used to define the full color gamut. In practice, this can be done by finding the convex hull of the measured patch values that were used to characterize the device response function. Similarly, the lattice points on the surface the device response function shown in FIG. 3 can be connected to form small facets which define the surface of the full color gamut. In one preferred embodiment of the present invention, each of the lattice squares on the surface of the device response function are broken into triangular facets.

Once the full color gamut has been defined, there are a number of ways that the full color gamut information can be stored. For example, one approach is to form a gamut descriptor which comprises a list of the positions for each of the triangular facets. This approach can be generalized to include facets of any polygonal shapes. Another method which is quite convenient in many cases involves the formation of a gamut descriptor which stores the gamut radius values for a series of lightnesses and hue angles, as is described in commonly-assigned U.S. patent application Ser. Nos. 08/634,685 and 08/782,852, the disclosures of which are herein incorporated by reference.

Figure 6:
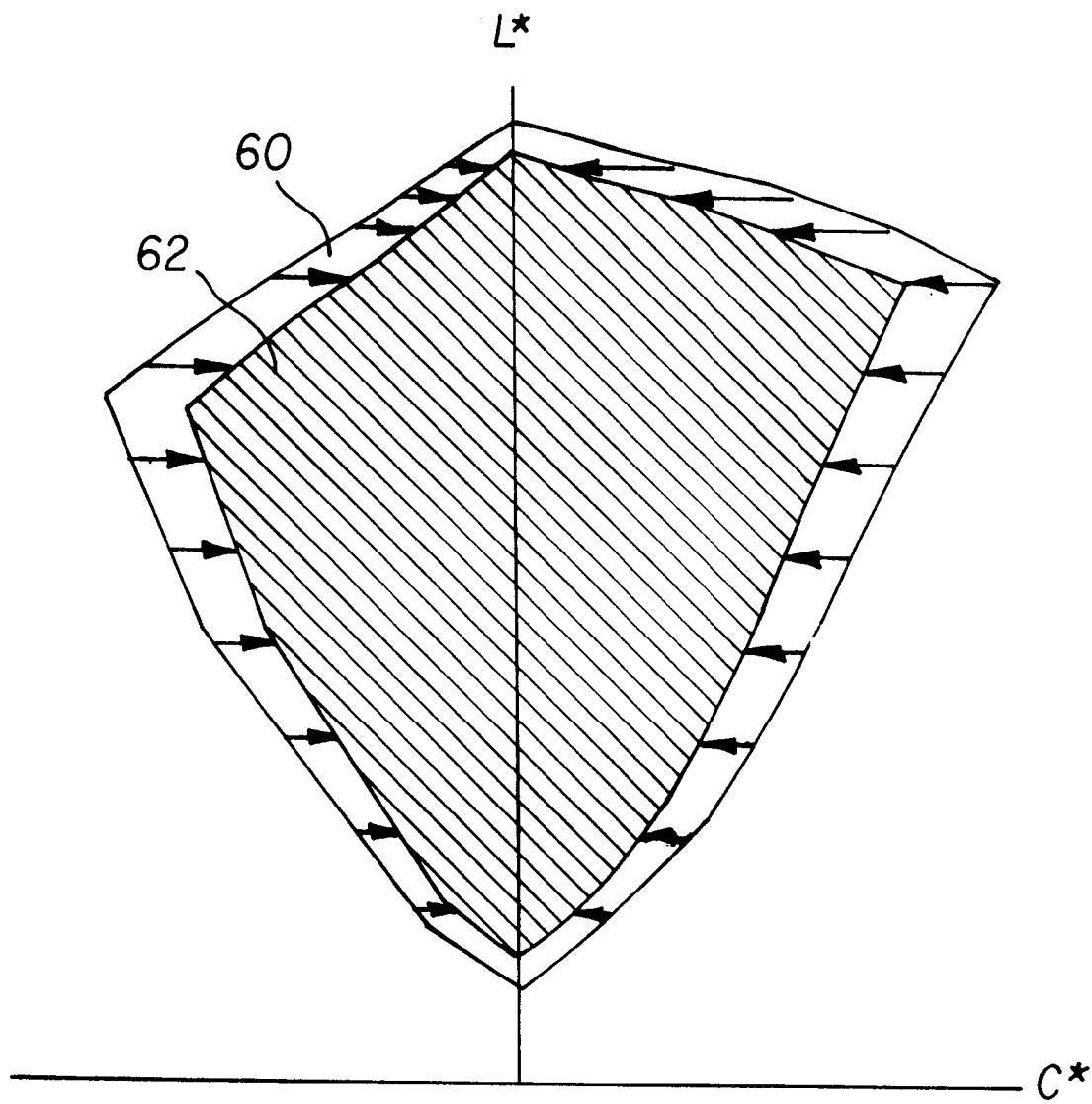
FIG. 6 is a diagram illustrating the creation of a reduced color gamut.

Next, a reduced color gamut creation step 52 is used to shrink the size of the full color gamut to form a reduced color gamut. This is done to provide a convenient way to avoid the portions of the color space that correspond to the approximately invariant regions of the device response. The gamut should be shrunk by an amount large enough to ensure that the portions of the color space that correspond to the approximately invariant regions of the device response are not contained within the reduced color gamut. As will be shown, this is a key aspect of the present invention, and makes it possible to transform input color values in a way that avoids the artifacts associated with the prior art techniques. FIG. 6 illustrates this process. Here, a cross-section of the full color gamut 60 is shown in the CIELAB color space, where a vertical slice has been taken through the color space. The reduced color gamut 62 is also shown, together with a series of vectors which represent the amount that the color gamut has been shrunk.

There are many ways to form the reduced color gamut in accordance with the method of the present invention. For example, the gamut can be reduced by shrinking the gamut by a fixed color difference toward the neutral axis. If the color gamut were described using a gamut descriptor which stores the gamut radius values as a function of lightness and hue angle, this can be accomplished by simply subtracting a fixed quantity from each of the gamut radius values. Alternatively, gamut radius can be shrunk fractionally toward the neutral axis, so that the radius of the reduced color gamut is a fixed fraction of the radius of the full color gamut. In another approach, the color gamut can be reduced by shrinking the gamut towards a single gray point, either fractionally or using a fixed increment. Yet another method for reducing the color gamut that can be used in accordance with the present invention is to limit the range of possible device control signals to a subset of the full range of possible control signals. For example, if it is determined that the device response function does not change significantly if the device control signal is changed beyond a certain limit, then the color gamut can be limited to the colors that can be produced within the limited range of device control signals. It will be apparent to one skilled in the art that there are other approaches that could be used to reduce the size of the color gamut as well.

There are several different applications for the present invention. For example, it can be applied to a set of input color values, or to each pixel of a digital image. In this case, a corresponding set of device control signals are determined for each of the input color values. Alternatively, the method can be used to populate a color transform which can then be applied to a digital image at a later time. In this case, a lattice of input color values is typically processed, and the results are stored in the form of a multi-dimensional look-up table. In either case, there will generally be a set of input color values which need to be processed.

An input color value from the set of input color values is specified using a color value specification step 53. If the method is being applied to an image, the input color value will correspond to some pixel in the digital image. If the method is being used to populate a color transform, the input color value will correspond to a node in the multi-dimensional look-up table.

Figure 7:
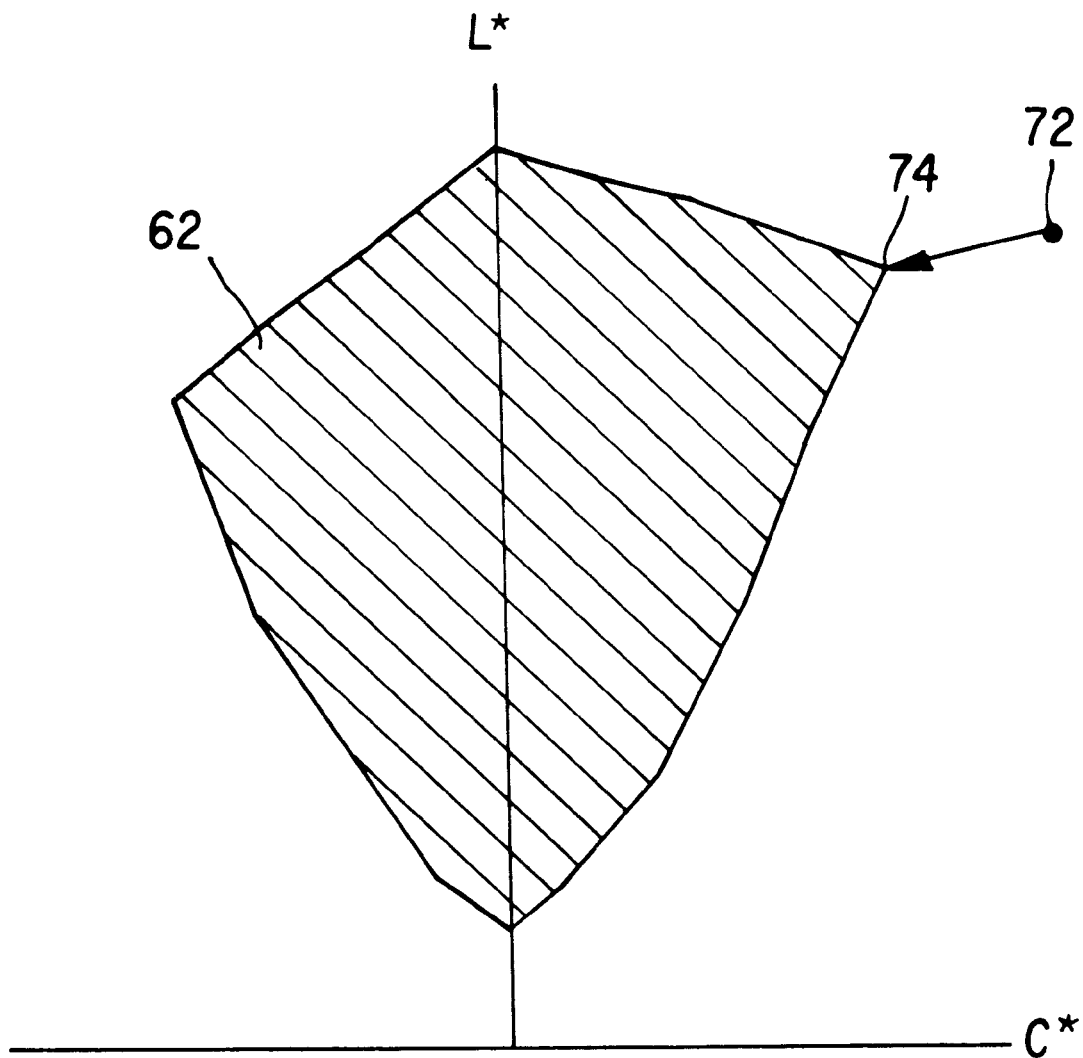
FIG. 7 is a diagram illustrating the mapping of colors outside of the reduced color gamut into the reduced color gamut.

For the specified input color value, a color value gamut check step 54 is used to identify whether the input color value is outside the reduced color gamut. If it is inside the reduced color gamut, it is not necessary to modify the input color value. However, if the input color value is outside the reduced color gamut, a gamut mapping step 55 is used to map the input color value to a modified input color value that is within or on the surface of the reduced color gamut. A diagram illustrating this process is shown in FIG. 7. In this case, an input color value 72 is shown which is outside of the reduced color gamut 62. The input color value 72 is mapped to a modified input color value 74 which is on the surface of the reduced color gamut 62.

In some cases, it may be desirable to modify the input color values that are within the reduced color gamut, as well as those that are outside the reduced color gamut. This approach can be used to compress the in-gamut colors slightly to make room for some of the out-of-gamut colors. As a result, it is not necessary to simply clip all of the out-of-gamut colors right to the surface of the reduced color gamut, which can result in clipping artifacts in certain cases. These techniques are sometimes referred to as gamut compression strategies, and are part of a broad class of sophisticated gamut mapping techniques that can be used to address this problem.

Once the modified input color value is determined that is within the reduced color gamut, a corresponding device control signal determining step 56 is used to determine the device control signals that are necessary to produce the modified input color value. This is accomplished using the previously determined color response function for the color printing device. Generally, the color response function gives the device response as a function of the device control signals. In this case, it is generally necessary to invert this process to calculate the device control signals necessary to produce the device response associated with a specific modified input color value. If a polynomial model was used to characterize the device response function, it is sometimes possible to determine an inverse transform using simple mathematical techniques. In other cases, it may be necessary to use iterative approaches to invert the device response function. When an interpolative model of the device response function is used, inverse interpolation methods are generally used to compute the inverse transform. Since the modified color values will all be within the reduced color gamut, the resulting device control signals should all correspond to portions of the color space where the output response is not approximately invariant with device control signal.

Steps 53 through 56 are repeated for each of the input color values in the set of input colors values. If all of the input color values have been processed, the end of process test 57 is used to terminate the process.

The present invention can produce a color transform that can be stored in a computer readable storage medium and used by a computer. The computer readable storage medium may comprise, for example; magnetic storage media such as magnetic disc (such as a sloppy disc) or magnetic tape; optical storage media such as optical disc, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST

10 lattice of device control signals
20 device response function
22 toe portion of the device response function
24 shoulder portion of the device response function
30 device response function
32 non-extreme device control signals
34 extreme device control signals
40 lattice cube
42 tetrahedra
50 device color reproduction characteristics determining step
51 device color gamut determining step
52 reduced color gamut creation step
53 color value specification step
54 color value gamut check step
55 gamut mapping step
56 corresponding device control signal determining step
57 end of process test
60 full color gamut
62 reduced color gamut
72 input color value
74 modified input color value

What is claimed is:

1. A method for transforming input color values to device control signals for a color printing device having an output response that is approximately invariant for ranges of the device control signals near the maximum or minimum allowable device control signals, wherein the input color values are transformed into the device control signals that are to be used to reproduce the input color values, comprising the steps of:

a) determining color reproduction characteristics for the color printing device over an allowable range of input signal values;

b) determining a full color gamut for the color printing device describing a full range of color values that can be produced by the color printing device;

c) creating a reduced color gamut by shrinking the full color gamut to substantially eliminate the portions of the full color gamut where the output response is approximately invariant; and d) transforming the input color values to the device control signals using the determined color reproduction characteristics of the color printing device, wherein the input color values that are outside the reduced color gamut are mapped to color values that are on or within the reduced color gamut.

2. The method of claim 1 wherein the color reproduction characteristics for the color printing device are determined by measuring the output response for a set of color patches printed using known device control signals.

3. The method of claim 2 wherein the device control signals for the set of color patches include a lattice of device control signals.

4. The method of claim 2 wherein the output response is measured in terms of a CIE based color space.

5. The method of claim 2 wherein the output response is measured in terms of a set of optical densities.

6. The method of claim 2 wherein the input color values are transformed to the device control signals by interpolating between the measured output response values for the set of color patches.

7. The method of claim 1 wherein the color reproduction characteristics for the color printing device are determined by developing a model of the output response.

8. The method of claim 7 wherein the input color values are transformed to the device control signals using the model of the output response for the device.

9. The method of claim 1 wherein the full color gamut is determined from the color reproduction characteristics for the color printing device.

10. The method of claim 9 wherein the full color gamut is determined by finding the convex hull of all possible output response values.

11. The method of claim 9 wherein the full color gamut is determined by finding the convex hull of measured output response values for a set of color patches printed using device control signals that span the range of possible device control signals.

12. The method of claim 1 wherein the full color gamut is represented by a gamut descriptor.

13. The method of claim 12 wherein the gamut descriptor is comprised of a list of polygons covering the surface of the color gamut.

14. The method of claim 12 wherein the gamut descriptor is comprised of a list of gamut radius values for a series of different lightness and hue angle values.

15. The method of claim 1 wherein the reduced color gamut is determined by shrinking the full color gamut by a fixed color difference toward the neutral axis.

16. The method of claim 1 wherein the reduced color gamut is determined by shrinking the full color gamut by a fixed color difference toward a gray point.

17. The method of claim 1 wherein the reduced color gamut is determined by shrinking the full color gamut by a fractional amount toward the neutral axis.

18. The method of claim 1 wherein the reduced color gamut is determined by shrinking the full color gamut by a fractional amount toward a gray point.

19. The method of claim 1 wherein the reduced color gamut is determined by limiting the range of possible device control signals to a subset of the full range of possible control signals.

20. The method of claim 1 wherein the input color values that are outside the reduced color gamut are mapped to color values that are on a surface of the reduced color gamut using a gamut clipping strategy.

21. The method of claim 1 wherein the input color values that are outside the reduced color gamut are mapped to color values that are on or within the reduced color gamut using a gamut compression strategy.

22. The method of claim 1 wherein the input color values are transformed to the device control signals using the determined color reproduction characteristics for the color printing device.

23. The method of claim 1 wherein the color printing device is a hardcopy color printing device.

24. The method of claim 1 wherein the color printing device is a softcopy color printing device.

25. A method for transforming input color values associated with pixels of a digital image to device control signals for a color printing device having an output response that is approximately invariant for ranges of the device control signals near the maximum or minimum allowable device control signals, wherein the input color values are transformed into the device control signals that are to be used to reproduce the input color values, comprising the steps of:
  a) determining color reproduction characteristics for the color printing device over an allowable range of input signal values;
  b) determining a full color gamut for the color printing device describing a full range of color values that can be produced by the color printing device;
  c) creating a reduced color gamut by shrinking the full color gamut to substantially eliminate the portions of the full color gamut where the output response is approximately invariant; and
  d) transforming input color values associated with pixels of a digital image using the determined color reproduction characteristics of the color printing device, wherein the input color values that are outside the reduced color gamut are mapped to color values that are on or within the reduced color gamut.

26. A method for creating a color transform for a color printing device having an output response that is approximately invariant for ranges of the device control signals near the maximum or minimum allowable device control signals, wherein the input color values are transformed into the device control signals that are to be used to reproduce the input color values, comprising the steps of:
  a) determining color reproduction characteristics for the color printing device over an allowable range of input signal values;
  b) determining a full color gamut for the color printing device describing a full range of color values that can be produced by the color printing device;
  c) creating a reduced color gamut by shrinking the lull color gamut to substantially eliminate the portions of the full color gamut where the output response is approximately invariant; and
  d) creating a color transform which maps the input color values to the device control signals using the determined color reproduction characteristics of the color printing device, wherein the input color values that are outside the reduced color gamut are mapped to color values that are on or within the reduced color gamut.

27. The method of claim 26 wherein the color transform is stored in a multi-dimensional look-up table.

28. A color transform for a color printing device that is used in a computer program product, comprising a computer readable storage medium, the transform stored therein being produced by a method for creating the color transform for the color printing device having an output response that is approximately invariant for ranges of device control signals near the maximum or minimum allowable device control signals, wherein the color transform maps input color values to the device control signals that are to be used to reproduce the input color values, comprising the steps of:
  a) determining color reproduction characteristics for the color printing device over an allowable range of input signal values;
  b) determining a full color gamut for the color printing device describing a full range of color values that can be produced by the color printing device;

c) creating a reduced color gamut by shrinking the full color gamut to substantially eliminate the portions of the full color gamut where the output response is approximately invariant; and d) creating the color transform which maps the input color values to the device control signals using the determined color reproduction characteristics of the color printing device, wherein the input color values that are outside the reduced color gamut are mapped to color values that are on or within the reduced color gamut.

* * * * *